UNITED STATES PATENT OFFICE.

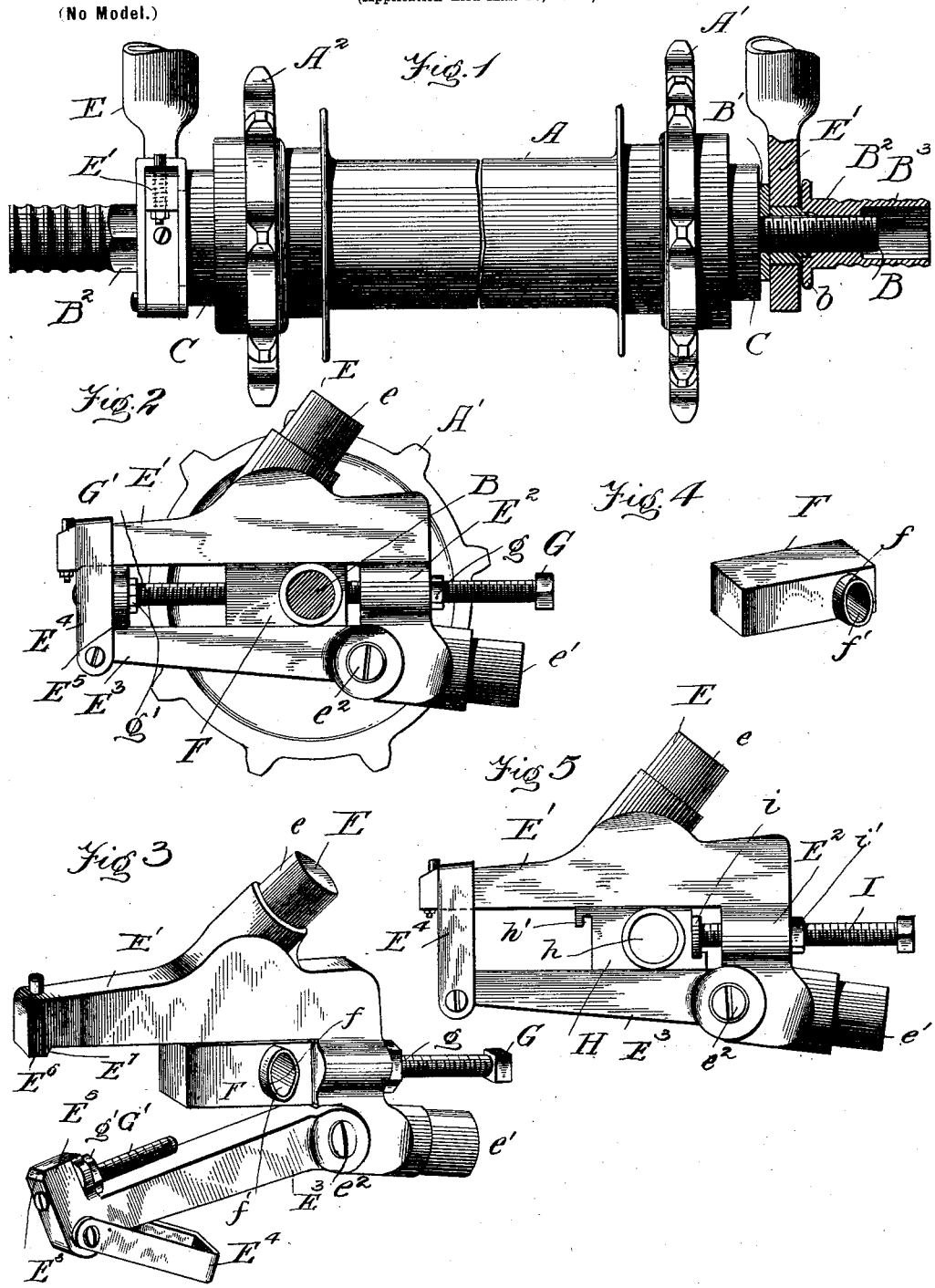

GEORGE A. ENNIS AND HANFORD H. ROSS, OF LIVINGSTON, MONTANA.

BICYCLE.

SPECIFICATION forming part of Letters Patent No. 628,082, dated July 4, 1899.

Application filed March 16, 1898. Serial No. 674,048. (No model.)

*To all whom it may concern:*

Be it known that we, GEORGE A. ENNIS and HANFORD H. ROSS, residents of Livingston, in the county of Park and State of Montana, have invented certain new and useful Improvements in Bicycles; and we do hereby declare that the following is a full, clear, and exact description thereof, reference being had to the accompanying drawings, and to the letters of reference marked thereon, which form a part of this specification.

This invention relates to an improved chain-adjusting device for bicycles of that class which is located in the fitting or junction-piece by which the rear members of the frame are joined.

A device embodying our invention consists of a stationary part or jaw attached rigidly to the frame and a movable part or jaw pivoted to the stationary part and constructed to form between the same when said movable part is in its normal or closed position a slot, within which is mounted a movable block provided with a bearing-aperture in which the rear-wheel axle is supported and which is adapted to be engaged by independent adjusting means, by which the position thereof and the axle within the slot may be controlled to vary the tension upon the driving-chain, said adjusting means being so constructed as to preserve the adjustment when the block is removed from the fitting.

The invention is herein shown as applied to a bicycle of that class in which the rear-wheel hub is provided with sprocket-wheels of different diameters, whereby the gear of the machine may be varied by presenting the different sprocket-wheels to the action of the driving-chain. As an improved construction in bicycles of this class the apertures in the blocks within which the opposite ends of the axle rest are located adjacent to one end of said blocks, so that when the larger sprocket-wheel is employed the ends of the blocks in which the bearing-apertures are located will be directed toward the front end of the machine and when the smaller sprocket-wheel is employed said blocks will be reversed, so that the ends containing said bearing-apertures will be directed toward the rear end of the machine.

The invention relates also to other features of improvement in devices of this character, as will hereinafter more fully appear.

In the drawings, Figure 1 is a view, partly in elevation and partly in section, of the rear-wheel hub and axle of a bicycle provided with our invention. Fig. 2 is an end view of the same with parts in section. Fig. 3 is a perspective view of the fitting in position to release the axle. Fig. 4 is a perspective view of the axle-block. Fig. 5 is a side elevation of a modified form of an adjusting device.

As shown in said drawings, A designates the hub of the rear wheel of a bicycle, and B the supporting-axle, which is rigidly mounted in the frame and upon which the hub turns.

C C designate bearing-rings which have screw-threaded engagement with the axle and upon which the cones or inner members of the bearing are formed.

E E designate as a whole the junction-pieces or fittings, to which the frame members are attached and to which the opposite ends of the axle are secured, as hereinafter described. Said hub A is provided, adjacent to each end thereof, with sprocket-wheels $A'$ $A^2$ of different diameters, said hub and axle being adapted to be removed from the fittings and reversed to alternately present the different sprocket-wheels to the action of the driving-chain, and thereby change the gear of the machine.

The fittings or junction-pieces E each consist of a stationary part or jaw $E'$, provided with a lug $e$, to which the lower end of one of the rear oblique members of the frame is rigidly secured, and with a right-angled portion $E^2$, provided with a lug $e'$, to which one of the bottom fork members is attached.

$E^3$ designates a movable jaw which is pivoted at one end to the part $E^2$ of the stationary jaw, said parts being provided with overlapping parts or lugs, through which passes a transverse pivot-pin $e^2$. The said movable jaw $E^3$ is held in its closed position by means of a yoke $E^4$, pivoted to the free end thereof and engaging at its opposite end the free end of the stationary jaw. As a means of retaining said yoke in its locking position the stationary jaw is provided with a spring-pressed pin $e^3$, engaging a socket therein and which when in its elevated position prevents the yoke from slipping off the stationary jaw. The proximate faces of said jaws are of such form that when the jaw $E^3$ is in its closed position said faces are parallel with each other and provide between the same a slot of uniform width within which the axle-supporting block F rests. Said block F is provided with parallel upper and lower faces, which engage the parallel proximate faces of the stationary and movable jaws, and is of slightly-greater lateral thickness than the jaws. Said block is clamped between a jam-nut B', which engages the outer face of the cone-ring, and a clamping-nut $B^2$, which has screw-threaded engagement with the outer end of the axle. The jam-nut and clamping-nut being of greater radial width than the width of the slot between the jaws, a space is provided between the same, within which the jaws rest, which is of such width as to permit the axle and block being readily removed from the jaws (when the lower jaw is dropped down) without loosening the clamping-nut or disturbing the adjustment of the cone, while at the same time preventing lateral movement of the jaws with respect to the axle. Said block is provided in its outer face with an annular flange $f$, which surrounds the bearing-aperture $f'$, in which the axle rests, and the clamping-nut $B^2$ is provided with a recess to receive said flange and is also provided with a radial flange $b$, which bears against the outer face of said block. As a preferred construction said clamping-nut $B^2$ is provided with an integral outwardly-projecting tubular extension $B^3$, which constitutes a mounting-step for the machine, and the axle projects beyond the fitting within said tubular portion $B^3$ a sufficient distance to strengthen the same.

As an improved construction in bicycles in which the rear hub is provided with a plurality of sprocket-wheels of different diameters the blocks F are constructed with the bearing-apertures $f'$ adjacent to one end thereof, so that the distance between the axle within said bearing-apertures and the driving-wheel of the machine may be varied by reversing the position of the blocks between the jaws. When a sprocket-wheel of large diameter is engaged with the driving-chain, said blocks are arranged with the apertures $f'$ in the forward ends of the slots, and when a smaller sprocket-wheel is to be used the blocks will be reversed in the slot, so as to bring the apertures therein adjacent to the rear ends of said slots. Ordinarily when sprocket-wheels of different diameters are used in connection with the rear-wheel hub they will be placed upon opposite ends of the hub, so that this change will be made by removing the wheel and axle from the fittings and reversing the same to present the sprocket-wheel to the driving-chain on that end of the hub opposite the wheel previously engaged thereby. It will therefore not be necessary to change the position of the supporting-blocks with relation to the axle when said axle is reversed for the purpose stated. Said blocks are so made as to compensate for the difference between the diameter of the different sprocket-wheels, so that when reversed the adjustment of the driving-chain will not be disturbed. The means for adjusting said block within the slot between said jaws to vary the tension upon the driving-chain consists in the present instance of a bolt which engages a screw-threaded aperture in the portion $E^2$ of the stationary jaw and bears at its rear end against the forward end of the block F, said part $E^2$ of the stationary jaw being enlarged, as shown, to afford strength to resist the thrust of said adjusting-bolt. Said bolt is provided with a jam-nut $g$, which engages the front face of said part $E^2$ of the stationary jaw, to prevent the bolt from being accidentally turned when the parts have been adjusted. As a further improvement and in order to more firmly hold said block within the slot and prevent the axle from moving rearwardly in the event of the driving-chain becoming stretched and to maintain said axle in proper alinement a movable locking-bolt G' is provided, which has screw-threaded engagement with a right-angled portion or lug $E^5$, attached to or formed integral with the free end of the movable jaw, which bolt engages at its inner end the rear end of said block. Said bolt is provided in its outer end with a slot, by means of which it may be engaged by a suitable tool to turn the same, and is provided with a jam-nut $g$, which engages the inner face of said right-angled portion $E^5$ and prevents accidental rotation of said bolt. When said block has been adjusted by means of the bolt G, the locking-bolt G' will be moved tightly against the same and will act against said adjusting-bolt to hold said block from movement within the slot.

With the construction described it will be noted that it will not be necessary to change the positions of the adjusting-bolt and locking-bolt when releasing the axle-block, as said locking-bolt will drop away from the block when the lower jaw is dropped down, and the block will be free to be removed. When said jaw is again closed, the locking-bolt will be moved against the block in locking position, as before.

As a further improvement the lug $E^5$ of the movable jaw has interlocking engagement with the stationary jaw, by means of which it is supported against the backward thrust of the locking-bolt G'. As herein shown, said stationary jaw projects slightly in rear of the movable jaw and is provided with a depending lug $E^6$, having on its inner face an oblique shoulder $E^7$, which engages an oblique shoulder $E^8$, formed on the lug $E^5$ of the movable jaw, when said jaw is in its upper or closed position. This construction serves to divide the strain resulting from the thrust of said bolt G' between said jaws and prevent undue strain from coming on the lug $E^5$ of the movable jaw.

In Fig. 5 is shown a modified form of adjusting device, in which the movable locking-bolt G of the construction previously described is omitted and in which one bolt serves as an adjusting and a locking bolt. Said construction is similar in other respects to that shown in the previously-described figures, and such similar parts are designated by common reference-letters. In said figure, H designates the axle-bearing block, which is similar to the block F before described and is provided with a bearing-aperture $h$, which is located adjacent to one end thereof. I designates an adjusting-bolt which has screw-threaded engagement with the part $E^2$ of the stationary jaw and has interlocking engagement at its rear end with the forward end of said block. As herein shown, said block is provided, on opposite ends thereof, with recesses $h'$, and the bolt is provided with a radially-extending annular flange adapted to engage the recesses on the adjacent end of the block. Said recesses $h'$ on the opposite ends of the block are located on vertically opposite sides of the block, so that when said block is reversed the recess of the adjacent end thereof will be in position to be engaged by said flange $i$ of the bolt. Said bolt is provided with a jam-nut $i'$, which engages the front face of the stationary jaw and by which accidental rotation of the bolt is prevented.

The feature of our invention herein described, embracing an axle-block provided with a bearing-aperture which is located adjacent to one end thereof, may be employed with a rear fitting or juncting-piece of other form than that herein shown or one not provided with a pivoted jaw, and we do not wish, therefore, to be limited to the construction herein shown.

We claim as our invention—

1. The combination with the rear members of a bicycle-frame and the rear-wheel axle, of a stationary jaw rigid with said frame, a movable jaw pivoted to the stationary jaw, an elongated apertured bearing-block between said jaws within which the axle rests, the aperture of which is located at one side of the longitudinal center thereof, and adjusting means engaging said block to move the same endwise with respect to the jaws.

2. The combination with the rear frame members of a bicycle and the rear-wheel axle, of a stationary jaw rigid with said frame members, a movable jaw pivoted to said stationary jaw and having on its free end an outwardly-facing shoulder which engages an inwardly-facing shoulder on said stationary jaw, an adjusting-bolt engaging the forward end of said block, and a locking-bolt having screw-threaded engagement with the free end of the movable jaw and bearing against the rear end of said block.

3. The combination with the rear frame members of a bicycle and the rear-wheel axle, of a stationary jaw rigid with said frame members, a movable jaw pivoted to said stationary jaw and having on its free end a lug which engages the adjacent face of the stationary jaw and closes the rear end of the slot formed between said jaws, said lug being provided with a rearwardly-facing shoulder which engages a shoulder on said jaw, an adjusting-bolt engaging the forward end of said bearing-block, and a locking-bolt bearing against the opposite end of said block and having screw-threaded engagement with said lug.

4. The combination with the rear members of a bicycle-frame and the wheel-supporting axle provided on the opposite ends thereof with sprocket-wheels of different diameters, stationary jaws rigid with said frame members, movable jaws pivotally connected with the stationary jaws and elongated, apertured bearing-blocks between said movable and stationary jaws within which the axle rests, the aperture of said blocks being located at one side of the longitudinal center thereof, and adjusting means engaging said blocks.

5. The combination with the rear members of a bicycle-frame and the rear-wheel axle, of a stationary jaw rigid with said frame members, a movable jaw pivotally attached to the stationary jaw, an apertured bearing-block between said jaws within which the axle rests, adjusting means engaging the forward end of said block, movable locking means engaging the rear end of the block, and clamping means engaging said block for securing the same rigidly upon the axle, said block being of greater lateral thickness than the jaws and the clamping means being constructed to overlap but not to closely engage the jaws.

In testimony that we claim the foregoing as our invention we affix our signatures, in presence of two witnesses, this 24th day of February, A. D. 1898.

GEORGE A. ENNIS.
HANFORD H. ROSS.

Witnesses:
DENNIS TREACY,
CHARLES MIKESELL.